United States Patent [19]

Inoue et al.

[11] 4,134,971
[45] Jan. 16, 1979

[54] GERMICIDAL, DISINFECTING AND ANTISEPTIC COMPOSITIONS CONTAINING CERTAIN ALKOXY ALIPHATIC AMINE COMPOUNDS

[75] Inventors: Shigeo Inoue, Sakura; Mitsuo Kondo, Chiba, both of Japan

[73] Assignee: Kao Soap Co., Ltd., Tokyo, Japan

[21] Appl. No.: 661,139

[22] Filed: Feb. 25, 1976

[30] Foreign Application Priority Data

Feb. 25, 1975 [JP] Japan .................................. 50/23283

[51] Int. Cl.$^2$ ..................... A01N 11/00; A61L 13/00; A01N 9/20
[52] U.S. Cl. .................................... 424/128; 424/256; 424/258; 424/304; 424/317; 424/319; 424/325; 424/331; 424/343; 424/DIG. 6
[58] Field of Search ................. 424/325, 128, DIG. 6, 424/256, 258, 304, 317, 319, 331

[56] References Cited

U.S. PATENT DOCUMENTS

| | | | |
|---|---|---|---|
| 2,474,412 | 6/1949 | Bersworth | 252/106 |
| 2,541,678 | 2/1951 | Swaney et al. | 424/325 |
| 2,841,521 | 7/1958 | Abramitis | 424/325 X |
| 2,885,441 | 5/1959 | Zenitz | 424/325 X |
| 3,054,656 | 9/1962 | Cassidy et al. | 23/106 |
| 3,072,529 | 1/1963 | Sanders et al. | 424/DIG. 6 X |

OTHER PUBLICATIONS

Kirk–Othmer—Encyclopedia of Chem. Tech. 2nd Ed. vol. 6, 1965; pp. 1–8 & 21–23.
Chemical Abstracts 70:80835j, 1969 (Noesler et al.).
Chemical Abstracts 70:99606g, 1969 (Noesler et al.).

*Primary Examiner*—Leonard Schenkman
*Attorney, Agent, or Firm*—Oblon, Fisher, Spivak, McClelland & Maier

[57] ABSTRACT

A germicidal, disinfecting and antiseptic composition comprising alkoxy aliphatic amine derivatives of the formula (I) or (II) and an organic or inorganic compound capable of blocking metals. The composition can be used in germicides, disinfectants, cosmetics, domestic sundries and city water, and to remove the microbial pollution and other contamination problems in industrial processes.

9 Claims, No Drawings

GERMICIDAL, DISINFECTING AND ANTISEPTIC COMPOSITIONS CONTAINING CERTAIN ALKOXY ALIPHATIC AMINE COMPOUNDS

The present invention relates to a non-medical germicidal, disinfecting and antiseptic composition which is extremely effective. More particularly, this invention relates to a germicidal, disinfecting and antiseptic composition comprising an alkoxy aliphatic amine derivative and an organic or inorganic compound capable of blocking metals wherein the activity of the alkoxy amines is greatly strengthened by the presence of the metal. The composition can be applied as a germicide, disinfectant, cosmetic, domestic sundry and to city water sources such as water reservoirs or circulating water. The composition can further be used to solve microbial pollution problems and other pollution problem industrial processes.

Drugs for controlling or eradicating the reproduction of harmful microorganisms, particularly germicides, disinfectants and antiseptics which are used under usual environmental circumstances must be very safe to such higher level organisms as human beings. Further, such drugs should possess broad spectrum antibacterial characteristics and substantial potency at low concentrations, as well as being soluble in many compounds and complexes thereof and having excellent adaptability to systems to be sterilized, disinfected and preserved against decay.

Typical germicides, disinfectants and antiseptics which are used in social environments include inorganic metal agents, organometal agents such as organic mercury agents and organotin agents, aromatic phenol derivatives represented by phenol, halogenated derivatives thereof and long-chain alkylammonium halides known as reversed soaps.

These organic metal agents have possessed broad spectrum antibacterial characteristics and strong germicidal or bacteriostatic action. However, it is known from the organomercury agents that such compounds possess substantial toxicity to high level organisms, particularly to mammals and can be the source of severe disorders. Organic tin agents analogous to organic mercury agents pose many of the same problems and questions as the mercury compounds. Currently, because of their problems with the conventional organometal reagents, their use is being restricted or prohibited, and they have lost their superiority as drugs.

Phenolic derivatives have been widely used as antibacterial substances, but they have, in general, narrow spectrum antibacterial properties and exhibit effects only at high concentrations. But at high concentrations these compounds are a source of irritability to higher level organisms and they possess unpleasant odors. In order to surmount these defects, many phenolic derivatives have been provided and in particular, halogenated derivatives have been advocated. However, pentachlorophenol (PCP), for example, has a high toxicity ($LD_{50}$; 29.0 mg/kg) in the human body and it has been demonstrated that it easily attacks the mucous membrane, the spleen and the like, and induces pharyngitis, bronchitis and pneumonia upon inhalation. Because of these problems, the use of the halogenated phenol is prohibited. Polychlorobiphenyl (PCB), a halogenated aromatic compound, has been used for a long time as a heat medium, however, it has been proven that when the compound is inhaled by mammals, that it has a violently toxic effect and is a cause of diseases in the internal organs. On the other hand, these compounds are not decomposed by natural environmental conditions and accumulate and widely pollute the natural world.

As is generally known, aromatic phenolic agents are, in general, inactive to gram-negative bacteria, such as those of the Pseudomonas group (*Pseudomonas aeruginosa* is an example of this group) which bring bacterial impediments to articles of commerce composed of long-chain hydrocarbon compounds such as cosmetics and domestic sundries. Accordingly, these agents are insufficient to prevent bacterial impediments.

Of the aromatic phenolic compounds, p-phenylphenol, salicyclic acid, p-hydroxybenzoic acid ester and benzoic acid derivatives are relatively safe and have been widely used. However, they possess hydrophobic properties and are only slightly soluble in water in which medium the antiseptic effects are exerted. Accordingly, in order to obtain the desired germicidal effect, several to several ten times the additional amounts are required, depending upon the system to be used, and depending upon the amount dissolved in the aqueous system. In fact, an amount added of 0.5% is insufficient to prevent bacterial pollution in emulsion systems of hydrocarbon derivatives and water.

In fact, when slightly soluble antibacterial agents are added to cosmetic emulsion systems, domestic sundries and the like containing long-chain hydrocarbonyl derivatives, these antibacterial agents frequently separate from the system, or destroy the properties of the product and severely damage the intended function and form of the article. For this reason, water-soluble alkaline salts of carboxylic acids, such as benzoic acid and salicylic acid are used, but they exhibit substantially reduced antibacterial effects in comparison with the corresponding acid form. Accordingly, amounts of the salts of several times the amounts of the free acids are required. The existence of an electrolyte often exerts a harmful influence on the stability of an emulsion system. For this reason, limited amounts of electrolyte are desired and consequently, the use of these alkaline salts is severely limited.

Of the reversed soaps which are widely known to be readily soluble in water and are known to exert significant antibacterial effects at low concentration, are typically the long-chain alkylbenzyldimethylammonium halides, which as is commonly known, are widely used as germicides, disinfectants and antiseptics in hospitals, food processing factories and dining halls for sanitary reasons. However, the reversed soaps cause problems because of their irritability and toxicity properties and are ill-fitted for the systems in which bubbling must be avoided, such as industrial water, reservoir water and circulating water for the reason of strong surface-activity ability. On the other hand, when the reversed soaps are used as antiseptics for emulsified articles, such as non-ionic emulsified cosmetics and domestic sundries, they take on a physiochemical form in which they cannot exert their expected antibacterial action because they are taken into the emulsion system because of their surface-active ability. Further, they change the emulsion system and tend to severely damage the properties and the form of the articles, and are accordingly ill-fitted for the emulsified articles. For this reason, scrupulous care must be taken when reversed soaps are used. Of the amphoteric surface active agents having superior safety which have been developed to overcome the defects of reversed soaps is a typical antibacterial agent, dodecylpolyaminoethylalanine, which also possesses the same unavoidable defect as the reversed soaps because of its surface-active ability.

In view of the various defects possessed by the existing antibacterial agents, an intensive investigation was started for novel antibacterial agents which do not possess the above-mentioned defects, and as a result, form the basis of a novel germicidal, disinfecting and antiseptic composition which improved the defects of the conventional antibacterial agents and is thus characterized by improved safety, broader spectrum antibacterial activity, lower concentration at which inhibitory action on bacterial growth is exerted and do not possess the various defects of cationic or amphoteric antibacterial agents having surface-active abilities. From the intensive investigation, the present invention has been developed.

Accordingly, this invention provides a germicidal, disinfecting and antiseptic composition comprising an alkoxy aliphatic amine derivative represented by the following formula (I)

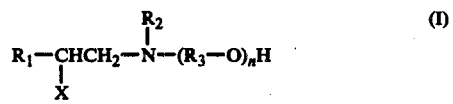

wherein $R_1$ represents an alkyl or alkenyl group having 8 to 18 carbon atoms, $R_2$ represents a hydrogen atom or an alkyl group having 1 to 3 carbon atoms, $R_3$ represents a hydrocarbonyl group having 2 to 3 carbon atoms, X represents a hydrogen atom or a hydroxy group and n is an integer of 1 or 2, or by formula (II)

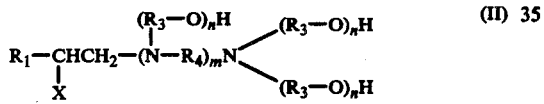

wherein $R_1$–$R_3$, X and n are the same as defined above, $R_4$ represents a hydrocarbonyl group having 2 to 3 carbon atoms and m is 0 or an integer of 1 or 2, and an organic or inorganic compound capable of blocking metals.

The alkoxy aliphatic amine derivatives of formulae (I) and (II) which are constituents of the composition of this invention, have broad spectrum antibacterial activity and exhibit inhibitory effects on bacterial growth at low concentrations, and at the same time, are water-soluble because of the alcoholic hydroxy groups.

In connection with safety, the toxicity of the composition is as low as the anionic surface active agents used as cleansers, and is only of mild irritability to the skin. Further, the surface-active ability of these derivatives is extremely poor in comparison with cationic and amphoteric surface active agents. These compounds are soluble in emulsified articles because of the non-ionic long-chain aliphatic portions of the molecules. Accordingly, they can be combined in articles without destroying the properties of the articles. Also, they exert an antiseptic effect on city water supplies such as reservoir water and circulating water at low concentration without bubbling. In the event that cleansing is necessary, these compounds may be used in combination with various surface-active agents without loss of their antibacterial activity.

However, alkoxy aliphatic amine derivatives of the formula (I) or (II), independently, exhibit only extremely weak germicidal effects on the bacteria of the Pseudomonas group such as *Pseudomonas aeruginosa*. Such bacteria are the sources of severe microbial pollution in articles of manufacture and various city water supplies. For this reason, when they are used as germicides and disinfectants, they must be applied in high concentrations. Accordingly, the benefits as described above may actually decrease.

According to an embodiment of the present invention, the coexisting presence of an organic or inorganic compound capable of blocking metals greatly enhances the antimicrobial activity of the alkoxy aliphatic amine derivatives of formula (I) or (II) against the Pseudomonas group. The increased activity cannot be attained by the alkoxy aliphatic amine derivatives alone. Accordingly, the present composition possesses superior germicidal, disinfecting and antiseptic effects.

Suitable organic and inorganic compounds capable of blocking metals in the present composition include organic compounds such as ethylenediamine tetraacetic acid and salts thereof (EDTA), nitriloacetic acid and salts thereof (NTA), malonic acid and salts thereof, citric acid and salts thereof, DL-aspartic acid and salts thereof, acetylacetone, 8-hydroxyquinoline, o-phenanthroline and the like; and inorganic compounds such as polyphosphoric acids such as tripolyphosphoric acid, pyrophosphoric acid and metaphosphoric acid and salts thereof.

Salts of the compounds described above include, in general, salts of the alkali metals such as sodium and potassium.

The ratio of the compounds capable of blocking metals to the alkoxy aliphatic amine derivatives depends upon the amount of the alkoxy aliphatic amine derivative to be used. The amount to be used of alkoxy aliphatic amines less, the amount to be used of the compounds capable of blocking metals larger, and vice versa.

For example, the ratio of disodium ethylenediamine tetra-acetate (EDTA-2Na) to N,N-bis(2-hydroxyethyl)-laurylamine is as follows:

| The amount of $n\text{-}C_{12}H_{25}N(CH_2CH_2OH)_2$ | Ratio of EDTA-2Na to $n\text{-}C_{12}H_{25}N(CH_2CH_2OH)_2$ |
|---|---|
| 10 ppm | 280 mole % |
| 20 ppm | 140 mole % |
| 50 ppm | 55 mole % |
| 100 ppm | 30 mole % |
| 1000 ppm | 3 mole % |
| 10000 ppm | 0.2 mole % |

The germicidal, disinfecting and antiseptic composition of the present invention may be used in combination with non-ionic, cationic and amphoteric surface-active agents without loss of antimicrobial activity when a cleansing is necessary.

Having generally described the invention, a further understanding can be obtained by reference to certain specific examples which are provided herein for purposes of illustration only and are not intended to be construed as limiting unless otherwise specified.

An estimation of the germicidal effect of the present invention was conducted as follows:

To 10 ml of a sterile saline solution or broth of the present composition having a fixed concentration was inoculated 1 ml of a broth of various microorganisms cultivated for three successive generations. After the mixture was cultivated in a thermostat at 30° C. for a given time, the amount of one platinum loop was withdrawn from the liquid to be tested, which was used to inoculate the broth. The resulting mixture was cultivated at 30° C. for 48 hours. At this time, the germicidal effect of the resulting broth was measured by using a turbidimeter.

EXPERIMENT 1

(1) Germicidal potency of n-$C_{12}H_{25}N(CH_2CH_2OH)_2$ alone against *Pseudomonas aeruginosa*

Table 1

| Test Compounds | Concentration ppm | Germicidal potency** Contact time | | |
|---|---|---|---|---|
| | | 60 minutes | 120 minutes | 180 minutes |
| n-$C_{12}H_{25}N$(CH$_2$CH$_2$OH)$_2$ | 10,000 | + | + | + |
| | 1,000 | + | + | + |
| | 100 | + | + | + |

**expression of germicidal potency . . .
+: non-germicidal
−: germicidal (2) Germicidal potency of n-$C_{12}H_{25}N(CH_2CH_2OH)_2$ in the existence of 1 mM EDTA-2Na against *Pseudomonas aeruginosa*

Table 2

| Test Compounds | Concentration ppm | Germicidal potency Contact time | | | |
|---|---|---|---|---|---|
| | | 2.5 (min.) | 5 (min.) | 10 (min.) | 15 (min.) |
| n-$C_{12}H_{25}N$(CH$_2$CH$_2$OH)$_2$ | 100 | − | − | − | − |
| | 50 | ± | − | − | − |
| | 20 | + | − | − | − |
| | 10 | + | + | + | + |

(3) Germicidal potency of n-$C_{12}H_{25}N(CH_2CH_2OH)_2$ in the existence of 0.1 mM EDTA-2Na against *Pseudomonas aeruginosa*

Table 3

| Test compounds | Concentration (ppm) | Germicidal potency Contact time (minutes) | | | |
|---|---|---|---|---|---|
| | | 2.5 | 5 | 10 | 15 |
| n-$C_{12}H_{25}N$(CH$_2$CH$_2$OH)$_2$ | 100 | ± | − | − | − |
| | 50 | + | ± | − | − |
| | 20 | + | + | − | − |
| | 10 | + | + | + | + |

EXPERIMENT 2

Germicidal potency of n-$C_{12}H_{25}N(CH_2CH_2OH)_2$ in the existence of various metal-blocking compounds against *Pseudomonas aeruginosa*

Table 4 n-$C_{12}H_{25}N$(CH$_2$CH$_2$OH)(CH$_2$CHOH)

| Metal-blocking compounds | | Germicidal potency Contact time (minutes) | | | |
|---|---|---|---|---|---|
| Concentration (mM) | Concentration (ppm) | 2.5 | 5.0 | 10 | 5 |
| Nitrilotriacetic acid-trisodium salt (NTA-3Na) | 10 mM 1000 | − | − | − | − |
| | 1.0 1000 | + | + | + | + |
| | 100 | + | + | + | + |
| | 0.1 1000 | + | + | + | + |
| | 100 | + | + | + | + |
| | 10 | + | + | + | + |
| Sodium citrate | 10 1000 | − | − | − | − |
| | 1.0 1000 | + | + | + | + |
| | 100 | + | + | + | + |
| | 0.1 1000 | + | + | + | + |
| | 100 | + | + | + | + |
| | 10 | + | + | + | + |
| o-phenanthroline | 10 1000 | − | − | − | − |
| | 1.0 1000 | + | + | + | + |
| | 100 | + | + | + | + |
| | 0.1 1000 | + | + | + | + |
| | 100 | + | + | + | + |
| | 10 | + | + | + | + |
| Sodium tripolyphosphate | 10 1000 | − | − | − | − |
| | 1.0 1000 | − | − | − | − |
| | 100 | − | − | − | − |
| | 0.1 1000 | − | − | − | − |
| | 100 | − | − | − | − |
| | 10 | + | + | + | + |

EXPERIMENT 3

Germicidal potency of n-$C_{12}H_{25}N(CH_2CH_2OH)_2$ in the existence of various metal-blocking compounds against *Escherichia coli* and *Proteus vulgaris*

Table 5 n-$C_{12}H_{25}N$(CH$_2$CH$_2$OH)$_2$

| Metal-blocking compounds | | Germicidal potency | | | | | |
|---|---|---|---|---|---|---|---|
| | | *Escherichia coli* Contact time (minutes) | | | *Proteus vulgaris* Contact time (minutes) | | |
| Concentration (mM) | Concentration (ppm) | 5 | 10 | 15 | 5 | 10 | 15 |
| n-$C_{12}H_{25}N(CH_2CH_2OH)_2$ | 1000 | − | − | − | − | − | − |
| | 100 | − | − | − | − | − | − |
| | 10 | + | + | + | + | + | − |
| Disodium ethylenediamine tetraacetate (EDTA-2Na) | 10 mM 1000 | − | − | − | − | − | − |
| | 1 100 | − | − | − | − | − | − |
| | 0.1 10 | − | − | − | − | − | − |

Table 5-continued $$\text{n-}C_{12}H_{25}N\begin{cases}CH_2CH_2OH\\CH_2CH_2OH\end{cases}$$

| Metal-blocking compounds | | | Germicidal potency | | | | | |
|---|---|---|---|---|---|---|---|---|
| | | | Escherichia coli | | | Proteus vulgaris | | |
| | | | Contact time (minutes) | | | Contact time (minutes) | | |
| Concentration (mM) | Concentration | (ppm) | 5 | 10 | 15 | 5 | 10 | 15 |
| Trisodium | 10 | 1000 | − | − | − | − | − | − |
| nitrilotriacetate | 1 | 100 | − | − | − | − | − | − |
| (NTA-3Na) | 0.1 | 10 | − | − | − | − | − | − |
| | 10 | 1000 | − | − | − | − | − | − |
| Sodium citrate | 1 | 100 | − | − | − | − | − | − |
| | 0.1 | 10 | − | − | − | − | − | − |
| | 10 | 1000 | − | − | − | − | − | − |
| Sodium malonate | 1 | 100 | − | − | − | − | − | − |
| | 0.1 | 10 | − | − | − | − | − | − |
| | 10 | 1000 | − | − | − | − | − | − |
| Sodium asparatate | 1 | 100 | − | − | − | − | − | − |
| | 0.1 | 10 | + | − | − | + | + | − |
| | 10 | 1000 | − | − | − | − | − | − |
| Acetylacetone | 1 | 100 | − | − | − | − | − | − |
| | 0.1 | 10 | − | − | − | − | − | − |
| | 10 | 1000 | − | − | − | − | − | − |
| 8-hydroxyquinoline | 1 | 100 | − | − | − | − | − | − |
| | 0.1 | 10 | + | − | − | − | − | − |
| | 10 | 1000 | − | − | − | − | − | − |
| o-phenanthroline | 1 | 100 | − | − | − | − | − | − |
| | 0.1 | 10 | − | − | − | − | − | − |
| | 10 | 1000 | − | − | − | − | − | − |
| Sodium tripolyphosphate | 1 | 100 | − | − | − | − | − | − |
| | 0.1 | 10 | − | − | − | − | − | − |

EXPERIMENT 4

Germicidal concentrations of the test compounds in 5 minutes-contact in the existence of 1.0 mM EDTA-2Na

EXPERIMENT 5

Germicidal potency of commercial germicides in the existence of 1.0 mM EDTA-2Na against *Pseudomonas aeruginosa*

Table 6

| Test compounds | Germicidal concentration (ppm) | | | | |
|---|---|---|---|---|---|
| | Staphylococcus aereus | Bacillus subtilis | Escherichia coli | Proteus vulgaris | Pseudomonas aeruginosa |
| n-$C_{12}H_{25}$NHCH$_2$CH$_2$OH | <10 | <10 | <10 | <10 | 20 |
| n-$C_{12}H_{25}$N(CH$_3$)CH$_2$CH$_2$OH | <10 | <10 | <10 | <10 | 40 |
| n-$C_{12}H_{25}$N(CH$_2$CH$_2$OH)$_2$ | <10 | <10 | <10 | <10 | 20 |
| n-$C_{10}H_{21}$CH(OH)CH$_2$NHCH$_2$CH$_2$OH | <10 | <10 | <10 | <10 | 25 |
| n-$C_{10}H_{21}$CH(OH)CH$_2$N(CH$_3$)CH$_2$CH$_2$OH | <10 | <10 | <10 | <10 | 35 |
| n-$C_{10}H_{21}$CH(OH)CH$_2$N(CH$_2$CH$_2$OH)$_2$ | <10 | <10 | <10 | <10 | 60 |
| n-$C_{12}H_{25}$N(CH$_2$CH$_2$OH)(CH$_2$)$_3$N(CH$_2$CH$_2$OH)$_2$ | <10 | <10 | <10 | <10 | 30 |
| n-$C_{12}H_{25}$[N(CH$_2$CH$_2$OH)(CH$_2$)$_3$]$_2$N(CH$_2$CH$_2$OH)$_2$ | <10 | <10 | <10 | <10 | 40 |
| n-$C_{10}H_{21}$CH(OH)CH$_2$N(CH$_2$CH$_2$OH)(CH$_2$)$_3$N(CH$_2$CH$_2$OH)$_2$ | <10 | <10 | <10 | <10 | 60 |
| n-$C_{10}H_{21}$CH(OH)CH$_2$[N(CH$_2$CH$_2$OH)(CH$_2$)$_3$]$_2$N(CH$_2$CH$_2$OH)$_2$ | <10 | <10 | <10 | <10 | 60 |

EXPERIMENT 7

Germicidal potency test in water and broth in 5 minutes-contact

Table 9

| Germicides | Maximum dilution at which germicidal effect is manifested | | | | | |
|---|---|---|---|---|---|---|
| | Pseudomonas aeruginosa | | Escherichia coli | | Proteus vulgaris | |
| | Water | Broth | Water | Broth | Water | Broth |
| n-$C_{12}H_{25}$N(CH$_2$CH$_2$OH)$_2$ (with CH$_2$CH$_2$OH) | <100 | <100 | 25,000 | 20,000 | 30,000 | 25,000 |
| n-$C_{12}H_{25}$N(CH$_2$CH$_2$OH)$_2$ + EDTA-2Na 0.5mM(0.016%) | 50,000 | 7,500 | 100,000 | 75,000 | 100,000 | 80,000 |
| [n-$C_{14}H_{25}$—N(CH$_3$)$_2$—CH$_2$—C$_6$H$_5$]$^+$ Cl$^-$ | 35,000 | 1,500 | 50,000 | 40,000 | 64,000 | 55,000 |
| NaOCl | 10,000 | 200 | 10,000 | 200 | 15,000 | 300 |

Table 7

| Test Compounds | Concentration (ppm) | Germicidal potency | | | | | | |
|---|---|---|---|---|---|---|---|---|
| | | Germicides alone Contact time (minutes) | | | Coexistance of EDTA Contact time (minutes) | | | |
| | | 5 | 15 | 60 | 5 | 15 | 30 | 60 |
| Sodium benzoate | 100000 | + | + | + | − | + | − | − | − |
| | 50000 | + | + | + | + | + | + | + | + |
| | 25000 | + | + | + | + | + | + | + | + |
| | 10000 | + | + | + | + | + | + | + | + |
| | 5000 | + | + | + | + | + | + | + | + |
| | 2500 | + | + | + | + | + | + | + | + |
| | 1000 | + | + | + | + | + | + | + | + |
| | 500 | + | + | + | + | + | + | + | + |
| | 250 | + | + | + | + | + | + | + | + |
| | 100 | + | + | + | + | + | + | + | + |
| Sodium salicylate | 100000 | − | − | − | − | − | − | − | − |
| | 50000 | + | + | − | − | + | + | − | − |
| | 25000 | + | + | + | + | + | + | + | − |
| | 10000 | + | + | + | + | + | + | + | + |
| | 5000 | + | + | + | + | + | + | ++ | + |
| | 2500 | + | + | + | + | + | + | + | + |
| | 1000 | + | + | + | + | + | + | + | + |
| | 500 | + | + | + | + | + | + | + | + |
| | 250 | + | + | + | + | + | + | + | + |
| | 100 | + | + | + | + | + | + | + | + |

EXPERIMENT 6

Germicidal potency of various metal-blocking compounds against *Pseudomonas aeruginosa*

Table 8

| Metal-blocking compounds | Concentration (mM) | Germicidal potency in 30 minutes-contact |
|---|---|---|
| Disodium ethylenediamine tetraacetate | 10 | + |
| Trisodium nitrilotriaacetate | 10 | + |
| Sodium citrate | 10 | + |
| Sodium malonate | 10 | + |
| Sodium DL-asparatate | 10 | + |
| Acetylacetone | 10 | + |
| 8-hydroxyquinoline | 10 | + |
| o-phenanthroline | 10 | + |
| Sodium tripolyphosphate | 10 | + |

EXAMPLE 1

Small species of gauze (2 cm × 2 cm) and linoleum plate (2 cm × 2 cm) were immersed in the mixed bacterial liquid for 10 minutes which was prepared by mixing the equivalent of bacterial liquids containing $10^6$/ml of *Pseudomonas aeruginosa, Escherichia coli* and *Staphylococcus aereus*, respectively. Thereafter picked up, the small species were immersed in germicidal, disinfecting liquid as described below for 10 minutes. Thereafter picked up, the species were placed on the plate of agar media and germicidal, disinfecting potency was estimated from the inhibition of bacterial growth.

Germicidal and disinfecting composition 1:

n-$C_{12}H_{25}$N(CH$_2$CH$_2$OH)$_2$   2.0%

EDTA-2Na   10.0% n-$C_9H_{19}$—C$_6$H$_4$—O(CH$_2$CH$_2$O)nH (n=10~15)   30.0%

Germicidal and disinfecting composition 2:

n-$C_{12}H_{25}$N(CH$_2$)$_3$N(CH$_2$CH$_2$OH)$_2$ (with CH$_2$CH$_2$OH)   2.0%

EDTA-2Na   10.0% n-$C_9H_{19}$—C$_6$H$_4$—O(CH$_2$CH$_2$O)nH (n=10~15)   30.0%

Table 10

| Germicidal and disinfecting agents | | Dilution | Germicidal and disinfecting potency | |
|---|---|---|---|---|
| | | | Dilution with water | Dilution with 5% broth aqueous solution |
| Composition of the present invention | Composition 1 | 10 | — | — |
| | | 100 | — | — |
| | | 500 | — | ± |
| | | 750 | — | + |
| | | 1000 | ± | + |
| | Composition 2 | 10 | — | — |
| | | 100 | — | ± |
| | | 500 | — | + |
| | | 750 | ± | + |
| | | 1000 | + | + |
| Comparative Composition | $[n\text{-}C_{14}H_{29}\overset{CH_3}{\underset{CH_3}{N}}-CH_2-\text{Ph}]^+ Cl^-$ 2% aqueous solution | 10 | — | — |
| | | 100 | — | ± |
| | | 500 | — | + |
| | | 750 | ± | + |
| | | 1000 | + | + |
| | NaOCl 2% aqueous solution | 10 | — | ± |
| | | 100 | — | + |
| | | 500 | ± | + |
| | | 750 | + | + |
| | | 1000 | + | + |

EXAMPLE 2

To 10 ml of industrial water was added each of suitable germicidal and disinfecting agents. After the industrial water continuously circulated overnight, germicidal and disinfecting potency were estimated from the transparency (measured with turbidimeter) and offensive smell of water.

To the hair rinse composition as described below was added the present antiseptic and commercial antiseptic having the fixed concentration. Thereafter, to 100 ml of hair rinse as described below was inoculated 1 ml of the mixed bacterial liquid containing each $10^8$/ml of *Pseudomonas aeruginosa*, *Escherichia coli* and *Proteus vulgaris* which induce bacterial pollution. The resulting mixture was stirred in a shaker. In a similar manner, miscella- Table 11

| | Germicidal and disinfecting agents | Dilution | After 30 days | | After 60 days | | After 90 days | | Notes |
|---|---|---|---|---|---|---|---|---|---|
| | | | Trans-parency | Offensive smell | Trans-parency | Offensive smell | Trans-parency | Offensive smell | |
| Composition of the present invention | 2% $n\text{-}C_{12}H_{25}N(CH_2CH_2OH)_2$ | 100 | — | — | — | — | — | — | |
| | | 500 | — | — | — | — | — | — | N-bubbling |
| | 10% EDTA-2Na | 1000 | — | — | ± | — | + | — | |
| | 2% $n\text{-}C_{12}H_{25}N(CH_2CH_2OH)_2$ | 100 | — | — | — | — | — | — | |
| | | 500 | — | — | — | — | — | — | N-bubbling |
| | 10% $Na_5P_3O_{10}$ | 1000 | — | — | ± | — | + | ± | |
| | 2% $n\text{-}C_{12}H_{25}N(CH_2)_3N(CH_2CH_2OH)_2$ with CH$_2$CH$_2$OH | 100 | — | — | — | — | — | — | |
| | | 500 | — | — | — | — | ± | — | Slight bubbling 100 fold dilution |
| | 10% EDTA-2a | 1000 | — | — | + | ± | + | + | |
| Comparative composition | 2% $[n\text{-}C_{14}H_{29}\overset{CH_3}{\underset{CH_3}{N}}-CH_2-\text{Ph}]^+ Cl^-$ | 100 | — | — | — | — | — | — | Violent bubbling 100 fold dilution |
| | | 500 | — | — | ± | — | + | ± | |
| | | 1000 | + | + | + | + | + | + | |
| | 2% NaOCl | 10 | — | — | — | — | + | ± | |
| | | 100 | — | — | + | ± | + | + | Inactivation by sunbeams |
| | | 500 | ± | ± | + | + | + | + | |

EXAMPLE 3

Antiseptic test of hair rinse system neous bacteria collected from the wall, floor and machine in the cosmetic factory and the atmosphere were increased in the broth so that the liquid contained $10^8$/ml of miscellaneous bacteria. After the liquid was inoculated, the mixture was preserved in a thermostatic room at 37° C. The amount of one platinum loop was picked up from hair rinse at regular intervals and inoculated to the broth. After cultivated at 37° C. for 24 hours, antiseptic potency was estimated from turbidity of the broth.

| Composition of hair rinse | |
|---|---|
| dipalmityldimethylammonium chloride | 5% |
| liquid paraffin | 5% |
| glycerine | 10% |
| sorbitol | 5% |
| polyoxyethylene lauryl ester (addition of 8 moles at ethylene oxide) | 3% |
| perfume and pigment | small amount |
| antiseptic | fixed amount |
| water | remainder |

EXAMPLE 4

The hair treatment was prepared having the composition as described below. Antiseptic potency was estimated by the same test method as in Example 3.

| Composition of hair treatment | |
|---|---|
| liquid paraffin | 10% |
| vaseline | 3% |
| beeswax | 5% |
| lanolin | 2% |
| Tween 60 | 3% |
| Span 60 | 2% |
| pigment, perfume | small amount |
| antiseptic | fixed amount |
| water | the remainder |

The results obtained are as shown in Table 13.

Table 12

Antiseptic potency in hair rinse

| | Antiseptics | Combination amount of antiseptics | Adding amount of EDTA-2Na | Antiseptic potency A | Antiseptic potency B | Influence on the form of articles |
|---|---|---|---|---|---|---|
| Compounds of the present invention | $n\text{-}C_{12}H_{25}NHCH_2CH_2OH$ | 0.03 | 0.05 | — | — | No influence on the form |
| | | 0.01 | 0.05 | — | — | |
| | $n\text{-}C_{12}H_{25}N(CH_3)CH_2CH_2OH$ | 0.05 | 0.05 | — | — | " |
| | | 0.01 | 0.05 | — | — | |
| | $n\text{-}C_{12}H_{25}N(CH_2CH_2OH)_2$ | 0.03 | 0.05 | — | — | " |
| | | 0.01 | 0.05 | — | — | |
| | $n\text{-}C_{12}H_{25}N(CH_2CH_2OH)(CH_2)_3N(CH_2CH_2OH)_2$ | 0.05 | 0.05 | — | — | " |
| | | 0.01 | 0.05 | — | — | |
| | $n\text{-}C_{12}H_{25}[N(CH_2CH_2OH)(CH_2)_3]_2N(CH_2CH_2OH)_2$ | 0.05 | 0.05 | — | — | " |
| | | 0.01 | 0.05 | — | — | |
| Comparative compounds | HO—C$_6$H$_4$—COOCH$_3$ / HO—C$_6$H$_4$—COOCH$_2$CH$_2$CH$_3$ (1:1 composition ratio by weight) | 0.50 | | + | + | Liquid tends to become slightly turbid at 0.5% |
| | | 0.40 | | + | + | |
| | | 0.30 | | + | + | |
| | | 0.20 | | + | + | |
| | 2-hydroxybenzoic acid (COOH or Na, OH) | 0.50 | | + | + | Liquid became turbid |
| | | 0.40 | | + | + | |
| | | 0.30 | | +· | + | |
| | | 0.20 | | + | + | |
| | HO—C$_6$H$_3$(CH$_3$)—CH(CH$_3$)$_2$ | 0.50 | | — | ± | Liquid became slightly turbid at 0.5% |
| | | 0.20 | | + | + | |
| | | 0.10 | | + | + | |
| | | — | | + | + | |
| | $[n\text{-}C_{14}H_{29}\text{-}N(CH_3)_2\text{-}CH_2\text{-}C_6H_5]^+ Cl^-$ | 0.50 | | + | + | It can be combined stable in the system, but antiseptic potency could not be manifested because of being taken in emulsion. Long stability cause trouble. |
| | | 0.10 | | + | + | |
| | | 0.05 | | + | + | |
| | | — | | + | + | |
| | $n\text{-}C_{12}H_{25}[NH(CH_2)_2]_2NHCH_2COOH$ | 0.50 | | ± | + | Liquid became white turbid. |
| | | 0.10 | | + | + | |
| | | 0.05 | | + | + | |
| | | — | | + | + | Poor stability. |

Table 13

| | Germicides | Antiseptic potency in hair treatment | | Form of articles |
|---|---|---|---|---|
| | | Combination amount (%) | Antiseptic potency | |
| Comparative compositions | | 0.2 | + | No significant form variation. |
| | Methyl p-hydroxybenzoate Propyl p-hydroxybenzoate (1:1 combination ratio by weight) | 0.3 | + | Agents separate and small particles appear in the article. |
| | | 0.4 | ± | More significant trend. |
| | | 0.2 | + | Poor stability of emulsion. |
| | Benzoic acid (or sodium salt thereof) | 0.5 | + | More significant trend particularly at 0.5%. |
| | Salicylic acid (or sodium salt thereof) | 0.2 | + | " |
| | | 0.5 | − | " |
| | o-phenylphenol | 0.2 | + | This compound exerts a significantly bad on the stability of emulsion, in comparison with the above four compounds. |
| | | 0.5 | + | |
| | Myristylbenzyldimethyl-ammonium chloride | 0.2 | − | This compound exerts an antiseptic effect in this system, but separates the system. This trend is more significant at 0.5% |
| | | 0.5 | − | |
| | Lauryldiaminoethyl-alanine | 0.2 | + | This compound destroys the emulsion and separates the system. |
| | | 0.5 | ± | |
| | N-lauryl-N,N-di-(2-hydroxyethyl)amine | 0.2 | ± | The system is well stable, but long-term stability causes problem at 0.5%. But this trend is only slight. |
| | | 0.5 | − | |
| Composition of the present invention | N-lauryl-N,N-di-(2-hydroxyethyl)amine and EDTA-2Na (0.5 mM, about 0.016% by weight) | 0.05 | − | Antiseptic potency is highly enhanced in comparison with n-$C_{12}H_{25}N(CH_2CH_2OH)_2$ alone. Stability of the system is good. |
| | | 0.075 | − | |
| | | 0.10 | − | |
| | | 0.125 | − | |

We claim:

1. A germicidal, disinfecting and antiseptic composition, comprising a synergistically effective amount of an alkoxy aliphatic amine compound represented by formula (I) or (II), $$R_1-\underset{X}{\underset{|}{C}}HCH_2-\underset{|}{\overset{R_2}{N}}-(R_3-O)_nH \quad (I)$$

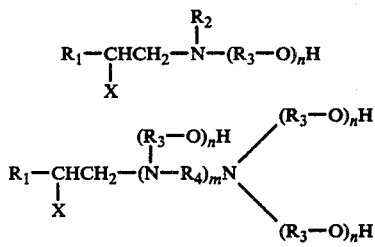

(II)

wherein $R_1$ represents alkyl or alkenyl having 8 to 18 carbon atoms, $R_2$ represents a hydrogen atom or alkyl having 1 to 3 carbon atoms, $R_3$ represents a hydrocarbon group having 2 to 3 carbon atoms, X represents a hydrogen atom or hydroxy, $R_4$ represents an alkyl group having 2 to 3 carbon atoms, n is 1 and m is 0 or an integer of 1 or 2, and a synergistically effective amount of an organic or inorganic compound capable of blocking metals selected from the group consisting of ethylenediamine tetracetic acid and alkali metal salts thereof, nitrilotriacetic acid and alkali metal salts thereof, malonic acid and alkali metal salts thereof, citric acid and alkali metal salts thereof, DL-aspartic acid and alkali metal salts thereof, acetyl acetone, 8-hydroxyguinoline, φ-phenanthroline, tripolyphosphoric acid and alkali metal salts thereof, pyrophosphoric acid and alkali metal salts thereof, and metaphosphoric acid and alkali metal salts thereof, said synergistically effective amounts being in a ratio of 0.1 to 10 m M of the metal blocking compound for every 10 to 1000 parts of the amine compound per million parts of the total composition.

2. A germicidal, disinfecting and antiseptic composition, comprising a synergistically effective amount of an alkoxy aliphatic amine compound represented by the formula (I)

$$R_1-\underset{X}{\underset{|}{C}}HCH_2-\underset{|}{\overset{R_2}{N}}-(R_3-O)_nH \quad (I)$$

wherein $R_1$, $R_2$, $R_3$, X and n are as defined in claim 1, and a synergistically effective amount of an organic or inorganic compound capable of blocking metals selected from the group consisting of ethylenediamine tetracetic acid and alkali metal salts thereof, nitrilotriacetic acid and alkali metal salts thereof, malonic acid and alkali metal salts thereof, citric acid and alkali metals salts thereof, DL-aspartic acid and alkali metal salts thereof, acetyl acetone, 8-hydroxyguinoline, φ-phenanthroline, tripolyphosphoric acid and alkali metal salts thereof, pyrophosphoric acid and alkali metal salts thereof, and metaphosphoric acid and alkali metal salts thereof, said synergistically effective amounts being in a ratio of 0.1 to 10 m M of the metal blocking compound for every 10 to 1000 parts of the amine compound per million parts of the total composition.

3. A germicidal, disinfecting and antiseptic composition, comprising a synergistically effective amount of an alkoxy aliphatic amine compound represented by the formula (II), $$R_1-\underset{X}{\underset{|}{C}}HCH_2-(N-R_4)_mN\underset{(R_3-O)_nH}{\overset{(R_3-O)_nH}{\diagdown}} \quad (II)$$

wherein $R_1$, $R_2$, $R_3$, $R_4$, m, n and X are as defined in claim 1, and a synergistically effective amount of an organic or inorganic compound capable of blocking metals selected from the group consisting of ethylenediamine tetracetic acid and alkali metal salts thereof, nitrilotriacetic acid and alkali metal salts thereof, malonic acid and alkali metal salts thereof, citric acid and alkali metal salts thereof, DL-aspartic acid and alkali metal salts thereof, acetyl acetone, 8-hydroxyquinoline, φ-phenanthroline, tripolyphosphoric acid and alkali metal salts thereof, pyrophosphoric acid and alkali metal salts thereof, and metaphosphoric acid and alkali metal salts thereof, said synergistically effective amounts being in a ratio of 0.1 to 10 m M of the metal blocking compound for every 10 to 1000 parts of the amine compound per million parts of the total composition.

4. The composition of claim 2, wherein said alkoxy aliphatic amine is n-C$_{12}$H$_{25}$NHCH$_2$CH$_2$OH, n-C$_{12}$H$_{25}$NCH$_2$CH$_2$OH,
　　　　　　　　　　　　　　　　　　|
　　　　　　　　　　　　　　　　　　CH$_3$

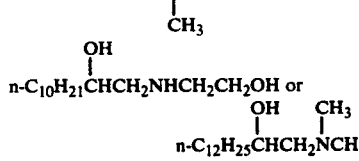

5. The composition of claim 3, wherein said alkoxy aliphatic amine is

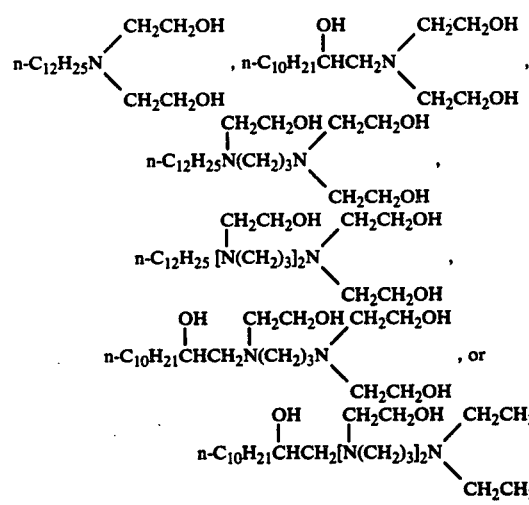

6. The composition of claim 1, wherein the organic compound capable of blocking metals is disodium ethylenediaminetetraacetate, sodium nitrilotriacetate, sodium citrate, o-phenanthroline, acetylacetone, 8-hydroxyquinoline or sodium aspartate.

7. The composition of claim 1, wherein the inorganic compound capable of blocking metals is sodium tripolyphosphate.

8. A germicidal, disinfecting and antiseptic composition, comprising:

| | |
|---|---|
| n-C$_{12}$H$_{25}$N(CH$_2$CH$_2$OH)(CH$_2$CH$_2$OH) | 2.0%, |
| Disodium ethylenediamine tetraacetate | 10.0%, and |
| n-C$_9$H$_{19}$—⟨phenyl⟩—O(CH$_2$CH$_2$O)$_n$H (n = 10~15) | 30.0%. |

9. A germicidal, disinfecting and antiseptic composition, comprising:

| | |
|---|---|
| n-C$_{12}$H$_{25}$N(CH$_2$CH$_2$OH)—(CH$_2$)$_3$—N(CH$_2$CH$_2$OH)(CH$_2$CH$_2$OH) | 2.0% |
| Disodium ethylenediamine tetraacetate and | 10.0% |
| [n-⟨phenyl⟩—O(CH$_2$CH$_2$O)$_n$H (n = 10~15)] n-C$_9$H$_{19}$—⟨phenyl⟩—O—(CH$_2$CH$_2$O)$_n$H (n = 10~15) | 30.0% |

* * * * *